(12) United States Patent
Haje et al.

(10) Patent No.: US 7,304,396 B2
(45) Date of Patent: Dec. 4, 2007

(54) TURBO-MACHINE AND METHOD FOR OPERATING THE SAME

(75) Inventors: Detlef Haje, Görlitz (DE); Helmut Pollak, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 142 days.

(21) Appl. No.: 10/541,995

(22) PCT Filed: Dec. 17, 2003

(86) PCT No.: PCT/EP03/14417

§ 371 (c)(1),
(2), (4) Date: Jul. 12, 2005

(87) PCT Pub. No.: WO2004/064230

PCT Pub. Date: Jul. 29, 2004

(65) Prior Publication Data

US 2006/0091731 A1    May 4, 2006

(30) Foreign Application Priority Data

Jan. 13, 2003    (EP) .................................. 03000726

(51) Int. Cl.
*H02K 44/00*    (2006.01)
(52) U.S. Cl. .................................................... 290/1 R
(58) Field of Classification Search ................. 290/1 R
See application file for complete search history.

(56) References Cited

U.S. PATENT DOCUMENTS

| | | | |
|---|---|---|---|
| 3,187,191 A | | 6/1965 | Baggs |
| 3,275,859 A | * | 9/1966 | Meyerand, Jr. et al. ........ 310/11 |
| 3,616,645 A | * | 11/1971 | Van Der Voort .............. 60/682 |
| 4,577,116 A | | 3/1986 | Pinson |
| 4,906,877 A | * | 3/1990 | Ciaio ........................... 310/11 |
| 4,935,650 A | * | 6/1990 | Hannan, III ................... 310/11 |
| 5,227,683 A | | 7/1993 | Clair |
| 5,273,465 A | * | 12/1993 | Meng ............................ 440/6 |
| 5,277,542 A | | 1/1994 | Nakanishi |
| 5,314,311 A | * | 5/1994 | Tada ............................ 417/50 |
| 5,352,139 A | * | 10/1994 | Laukien et al. ................ 440/6 |
| 5,687,560 A | | 11/1997 | Janes |
| 6,310,406 B1 | * | 10/2001 | Van Berkel ................... 290/43 |
| 6,696,774 B1 | * | 2/2004 | Schneider et al. ............ 310/11 |
| 7,033,478 B2 | * | 4/2006 | Harde ......................... 204/664 |

FOREIGN PATENT DOCUMENTS

| | | | |
|---|---|---|---|
| DE | 560 836 | | 10/1932 |
| EP | 0 931 931 A1 | | 7/1999 |
| FR | 2 429 517 | | 1/1980 |
| SU | 1145881 A | * | 8/1991 |
| SU | 1151175 A | * | 8/1991 |

\* cited by examiner

*Primary Examiner*—Joseph Waks

(57) ABSTRACT

A turbo-machine having a rotor, a stator, and a flow channel for an actuating fluid used to drive the rotor is disclosed. The turbo-machine has a magnet for producing a predeterminable magnetic field in the flow channel. The invention also relates to a method for operating a turbo-machine comprising a rotor, a stator, and a flow channel. Furthermore, an ion-containing actuating fluid flows through the flow channel and a defined magnetic field is produced in the flow channel, ions being deviated in the magnetic field.

24 Claims, 5 Drawing Sheets

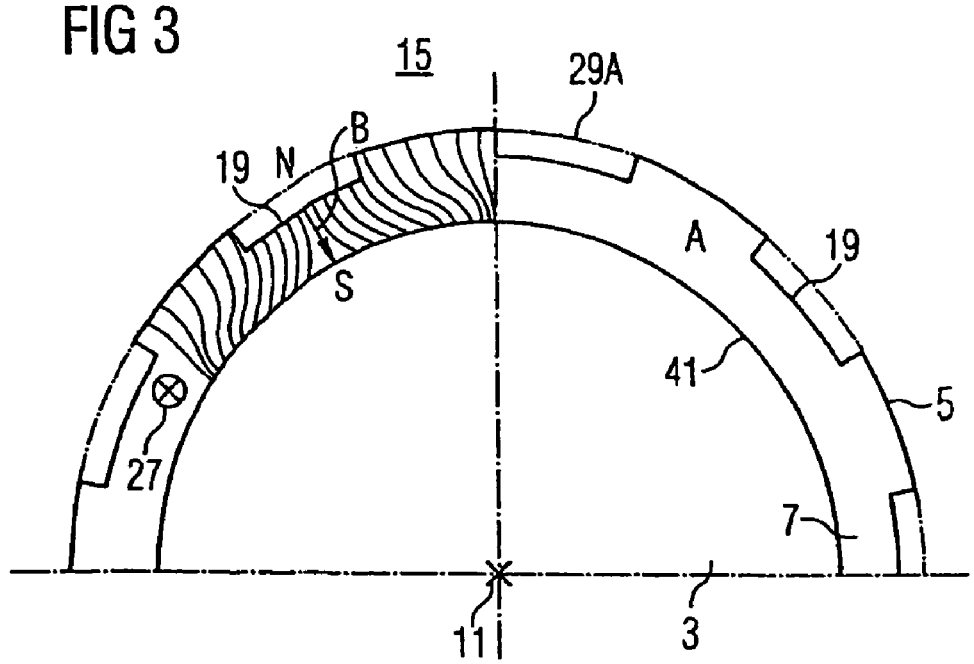
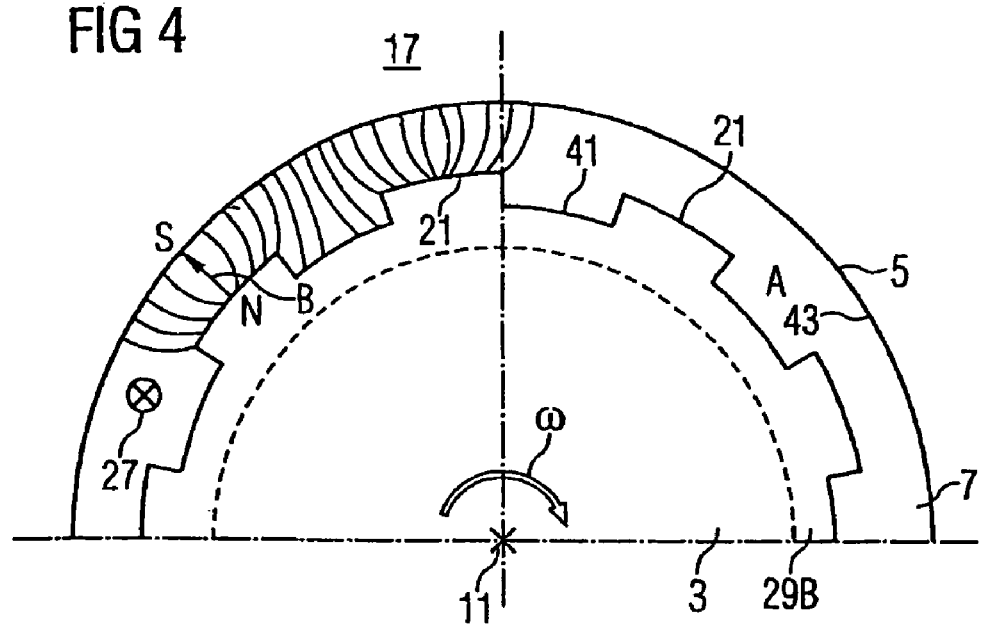

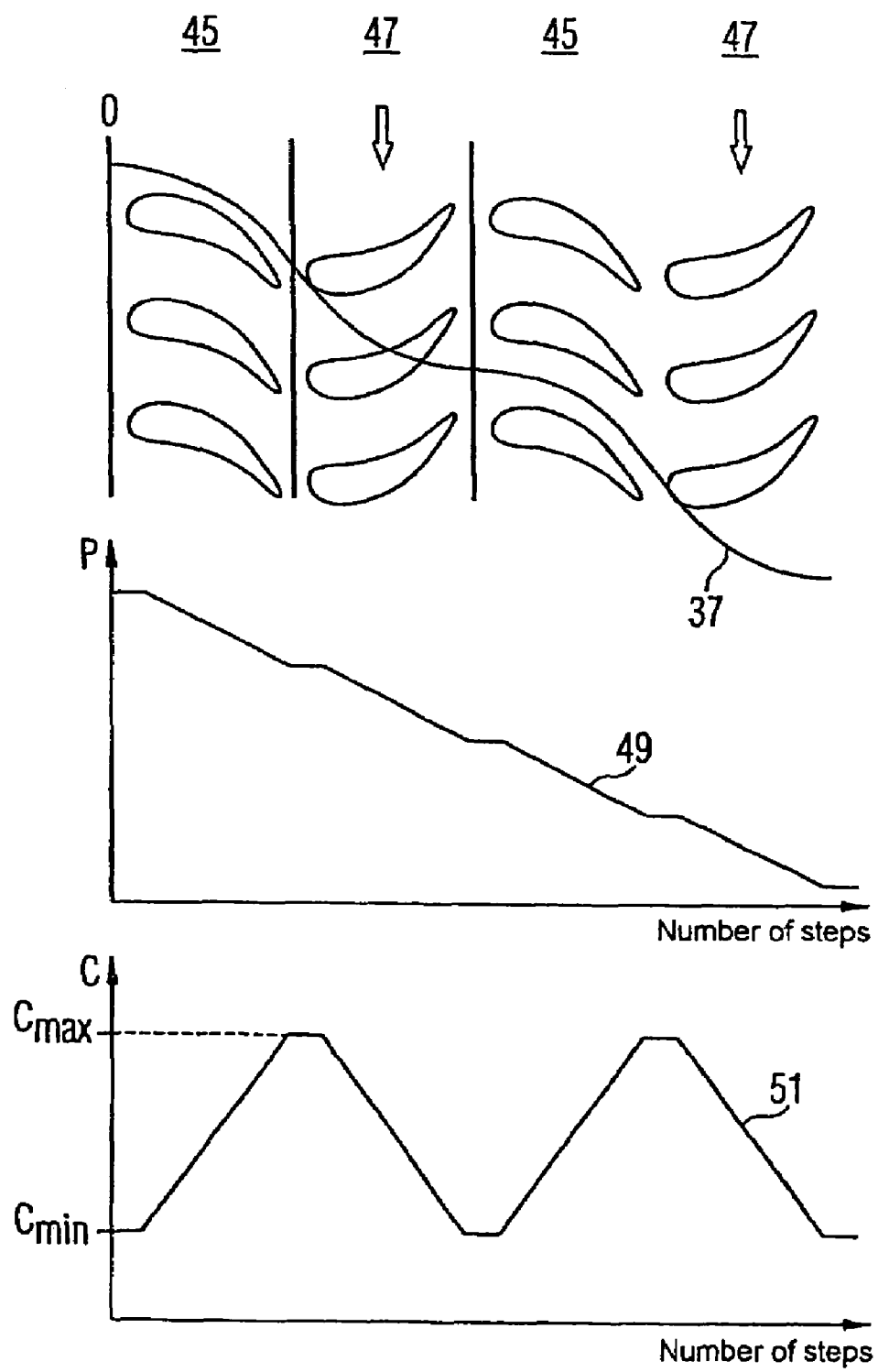

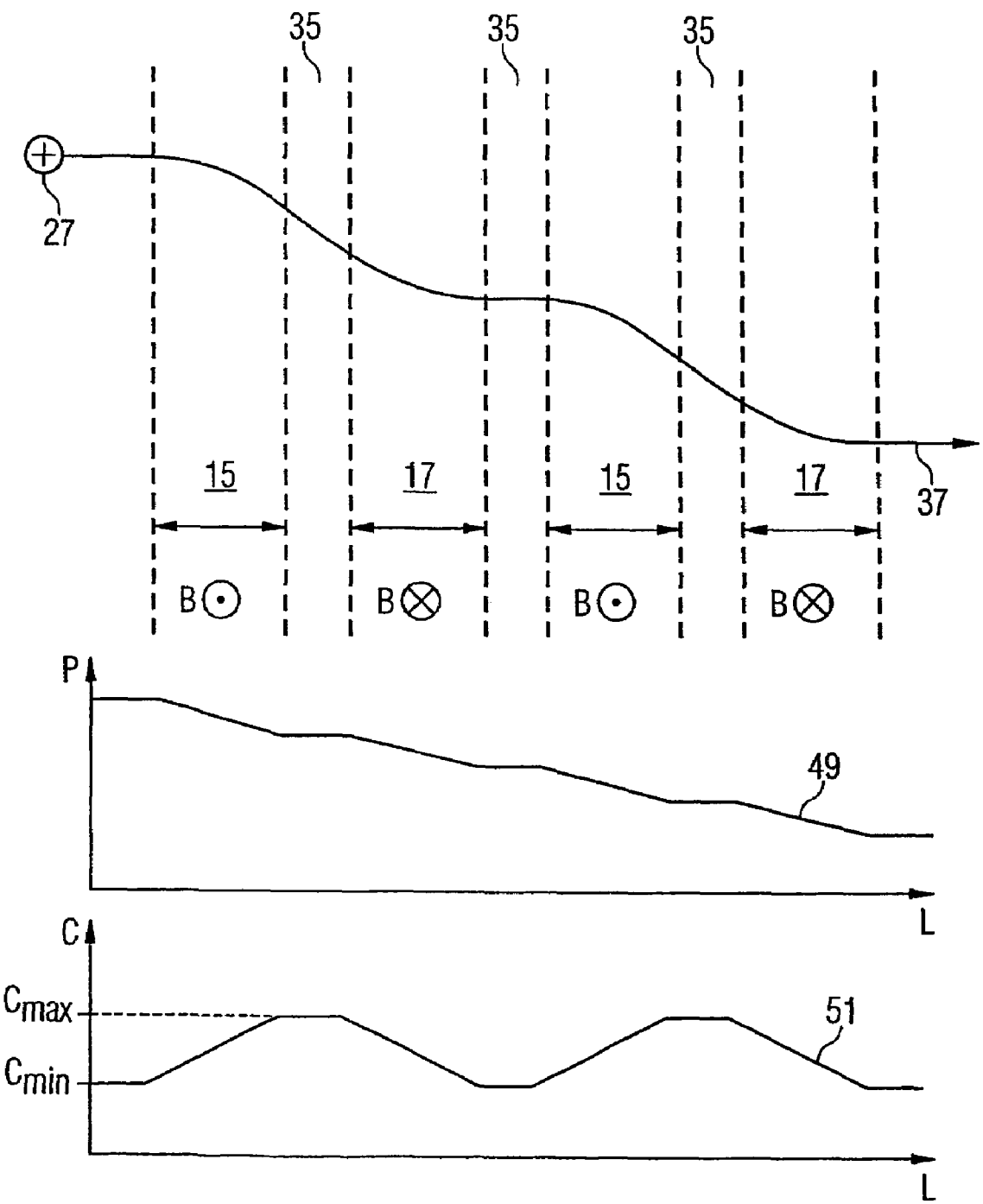

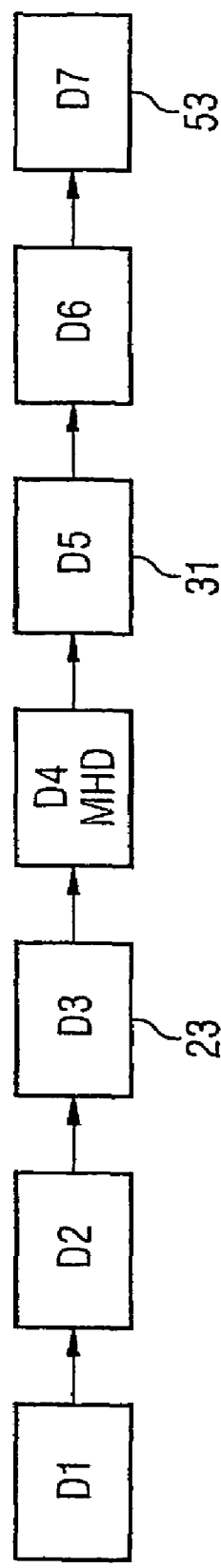
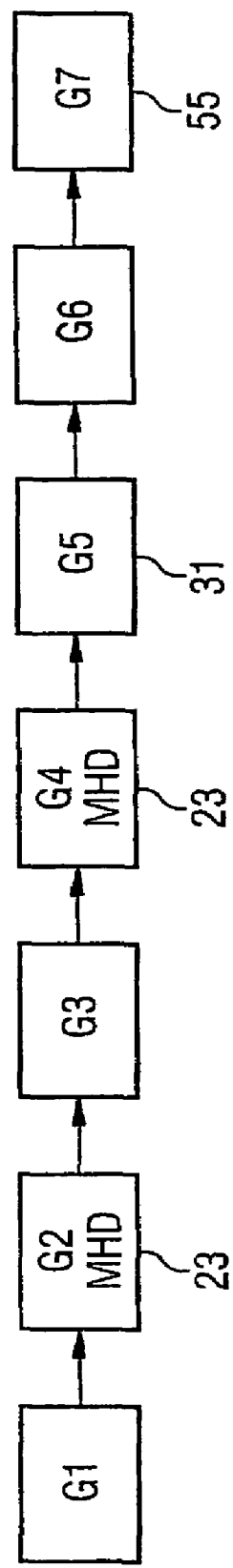

TURBO-MACHINE AND METHOD FOR OPERATING THE SAME

CROSS REFERENCE TO RELATED APPLICATIONS

This application claims priority to the European application No. EP03000726.4, filed Jan. 13, 2003 and to the International Application No. PCT/EP2003/014417, filed Dec. 17, 2003 which are incorporated by reference herein in their entirety.

FIELD OF INVENTION

The invention relates to a turbomachine with a rotor and with a stator, a flow duct being formed for an action fluid by means of which the rotor can be driven. The invention relates, furthermore, to a method for operating a turbomachine with a rotor and with a stator and with a flow duct.

BACKGROUND OF INVENTION

Turbomachines are known, for example conventional steam turbines or gas turbines, in the forms of construction of which, normally, the conversion of energy takes place by means of what are known as blade cascades or blade wheels which drive the rotor of the turbomachine with an action fluid, for example steam or hot gas flows through the turbomachine. The blade cascades used in this case have the function, in the flowing action fluid, of converting pressure energy into kinetic energy and converting kinetic energy into mechanical energy. These blade cascades are conventionally designed as moving blade cascades fastened to the rotor or as guide blade cascades in the casing.

SUMMARY OF INVENTION

For the design of blade cascades of this type, particularly at high temperatures of the action fluid flowing through the flow duct, it is necessary to ensure flow optimization, but, in particular, also the strength of, for example, the blade and blade fastening. There is particular significance, in this context, in the fact that the strength characteristic values of the high-temperature materials used decrease markedly at high temperatures. However, the aim is, in general, a higher process temperature, since this results in a rise in the thermodynamic efficiency of the turbomachine. This influence of the high operating temperature on the strength characteristic values of the materials used applies likewise to the rotors of thermal turbomachines.

In this case, in addition to the blades, the rotor is one of the components subjected to the highest stress, especially since, when high material temperatures are present, it is exposed to considerable centrifugal forces. Rotor centrifugal forces act in this case both on the rotor shaft and on the moving blades which are arranged on the circumferential surface of the rotor shaft. Moreover, further high-temperature effects on blades or rotors are to be noted. Reference may be made here, as an example, to high-temperature corrosion or oxidation. Blades for extremely high application temperatures, such as, for example, gas turbine blades, are therefore produced partially from monocrystalline workpieces and, because of the high temperatures of the action fluid, for example of the hot gas, need a considerable cooling requirement. For this purpose, a coolant mass flow is provided, which, in the case of a gas turbine, is extracted, for example, from a compressor preceding the gas turbine, as compressor extraction air which is routed through a complicated duct and bore system inside a hollow blade for cooling the blade (swirl, impact or film cooling). In addition, in the use of high temperatures in hot aggressive media, blades of this type require heat insulation layers for heat insulation and also corrosion protection layers. In this case, where gas turbines are concerned, turbine application temperatures of the hot gas of 1200° C. and above are possible. Where steam turbines are concerned, the typical process data amount, for example, to between 540° C. and 600° C. for the fresh steam temperature in the case of the fresh steam pressure of about 250 to 300 bar of the steam supplied to a conventional high-pressure part turbine.

The conversion of pressure energy into kinetic energy and of kinetic energy into mechanical energy, using guide blade cascades and moving blade cascades with conventional blading, therefore has some disadvantages. As a consequence of manufacture, the blades, of course, have a certain wall strength or thickness reducing the actual flow cross section of the flow duct.

This effect is also designated as the obstruction effect. Furthermore, because of the finite number of blades, there cannot be an optimum homogeneous deflection of the action fluid. In addition, blade cascades possess a flow resistance, that is to say boundary layers are formed on the blades, which may lead to secondary losses in the following blade cascades. As already discussed further above, because of the use of high-grade high-temperature materials, blades for use in high-temperature applications are very costly and of limited strength on account of the increased material and manufacturing costs. Owing to the strength aspects of the high centrifugal force loads on moving blades, the height of the blades, that is to say the maximum blade leaf length, is limited. In the event of a failure of a blade, for example as a result of a breakaway from the rotor due to an overshooting of the maximum permissible centrifugal force load, considerable consequential damage may occur in the turbomachine. Thus, for example, in an axial turbomachine, in particular, the following blade cascades arranged in the flow direction of the action fluid may be destroyed. A further disadvantage of the known bladings is attributable to the gap losses which always occur. Gap mass flows of action fluid, which pass through between a blade and component located opposite the blade so as to form a gap, result in an efficiency loss (gap loss). In order to keep the losses as low as possible, the gap mass flow must be limited by means of narrow clearances which are highly complicated to ensure in manufacturing processes. In this context, a minimum clearance should not be undershot for reasons of the operating reliability of the turbomachine. Gap losses of this kind were investigated, for example, in the dissertation of Helmut Pollak "Experimentelle Untersuchungen der Strömungsvorgänge in axialen Kaltluftturbine unter besonderer Berücksichtigung der Radialspaltströme und ihre Einflussparameter" ["Experimental investigations of the flow processes in axial cold-air turbines, with particular attention to the radial gap flows and their influencing parameters"], Rheinisch/Westfälische Hochschule, Aachen.

The book "Kraftwerkstechnik zur Nutzung fossiler, regenerativer und nuklearer Energiequellen" ["Power station technology for the utilization of fossil, regenerative and nuclear energy sources"] by K. Straus, 4th edition, Berlin, Heidelberg, Springer Verlag, 1998, pages 363-370, describes magnetohydrodynamic energy converters and power station concepts based on magnetohydrodynamic energy conversion. The magnetohydrodynamic principle, as such, has been known for a long time and, in the abovementioned literature reference, has already been incorporated into concepts for power stations, that are known as "MHD power stations". The basis for magnetohydrodynamic energy conversion (MHD) is the principle of electromagnetic induction which is also utilized in the conventional dynamo machine. According to this principle, a voltage is induced in an electrically conductive material when the latter moves in relation to a magnetic field. In an MHD generator, an electrically conductive fluid flows through the magnetic field. The action of the magnetic field results, in the fluid, in a separation of charges of opposite polarity and, consequently, in a direct conversation of potential energy of the plasma into electrical current. Electrical conductivity is in this case a particularly important property of the working medium in MHD generators. If the smoke gases from the combustion of fossil fuels are to be used as working medium, these must be in the plasma state in order to be electrically conductive. The atomic bonds of the electrons with the cores are broken up in this state, the gas then consisting predominantly of free electrons and positively charged ions. The partial ionization of a gas is achieved by heating to very high temperatures higher than 2000° C. For practical reasons, conductivity should amount to at least 10 S/m. In combustion gases, such values of this order of magnitude are reached only at temperatures of 2000 to 2500° C. by the addition of easily ionizable materials, such as caesium or potassium. On account of the functional principle provided for an MHD power station, however, it has not been possible to develop these power station concepts up to readiness for use.

The principle of the MHD generator according to this concept is, by means of combustion with highly heated combustion air, to generate the plasma state, a state in which positive ions and electrons are present in the gas, in a pressure-guiding combustion chamber. The hot plasma, when it emerges from the chamber, enters what is known as a diffuser. In this diffuser, the positive ions and the electrons are deflected by means of a magnetic field toward different electrodes where the electrons are absorbed and the ions lose their charge due to the absorption of electrons. A charge flux, that is to say a current, is thereby directly brought about. After emerging from the MHD generator, the gas is always still very hot, about 2300 K. For the further utilization of this heat energy available in the hot gas, the inflowing combustion air is preheated to approximately 2100 K by means of heat exchangers. The remaining heat energy is supplied to a following steam process by means of conventional waste heat recovery boilers. This concept entails considerable problems which have hitherto prevented its large-scale practical implementation:

Thus, for example, to achieve a plasma at 2500 K, the gas must be inoculated with easily ionizable substances (potassium, caesium), as already described above. These alkali metals are costly and can be handled only with difficulty. Moreover, they lead to the contamination and corrosive attack of the heat exchanger surfaces, such as are provided in the air heater and in the waste heat recovery boiler. Furthermore, extremely high temperatures for achieving the plasma state present considerable challenges in terms of suitable high-temperature materials for the MHD generator. This also affects components of the diffuser and of the heat exchangers. Furthermore, it has to be said that the achievable efficiency of the currently known and used GUD power stations has, in the meantime, been so high that a major increase in efficiency will be achieved only with great difficulty by means of the technology of MHD generators.

To that extent, preceding the steam power process with an MHD generator, which is difficult to implement in technical terms, competes with the steam power process being preceded with a gas turbine which is already proven and accepted on a large scale. However, difficult problems have to be solved, even outside the actual MHD generator, on the way to a commercial MHD plant. Most of these problems are due to the high temperature level in the plasma duct, for the construction of which all the metal materials known hitherto are ruled out. Even where the electrodes are concerned, erosion, corrosion and heat stresses limit the operating time to less than 1000 hours. Despite intensive research therefore, the commercial implementation of an MHD plant cannot be foreseen at the present time.

In a summarizing assessment of the concept known hitherto, it may be said that, in conventional gas turbines and steam turbines, the blades and rotor, in addition to combustion chamber and boiler components, are some of the most highly stressed components of turbomachines of this type. Thus, in particular, the inlet blading is particularly affected due to the high temperatures of the hot action fluid. The high-temperature strength of the blade materials in this case limits possible application temperatures and, in part, requires technically complicated cooling measures. For the manufacturers of gas turbines and steam turbines, however, the increase in the upper process temperature is an essential starting point for an increase in efficiency. Sometimes considerable efforts to raise the upper process temperature can be observed both in the area of gas turbine technology and in that of steam turbine technology. By contrast, the use of the magnetohydrodynamic effect in the MHD power stations described above has not had any large-scale application hitherto because of insufficient implementability, above all because of the disadvantageous principle of action and technological difficulties.

An object of the invention is to specify a turbomachine which avoids the disadvantages of the concept described above.

A further object of the invention is to specify a method for operating a turbomachine.

The first mentioned object is achieved, according to the invention, by means of a turbomachine with a rotor and with a stator, a flow duct being formed for an action fluid by means of which the rotor can be driven, a magnet being provided which serves for generating a predeterminable magnetic field in the flow duct.

The invention describes an entirely novel concept for a turbomachine, in which the magnetohydrodynamic effect is applied in order to deflect the flow medium within turbomachines, instead of blade cascades. It thus becomes possible to implement an "MHD turbine" or an "MHD compressor". The magnetohydrodynamic effect causes a deflection of electrically charged particles of a flow medium in the flow duct of the turbomachine. To generate a defined magnetic field, the magnet is provided, which deflects charged particles in the action fluid according to Lorenz force deflection. When the electrical charge is moved at a specific velocity in a predetermined magnetic field, described as magnetic induction, the electrical charge experiences a force. This force is always perpendicular to the velocity. Charged particles in the action fluid flowing through the flow duct therefore experience a deflection due to the defined magnetic field generated by the magnet, insofar as the magnetic field has at least one component perpendicular to the direction of movement of the charged particles, that is to say to the flow direction of the action fluid. In the ideal situation of an infinitely extending homogenous magnetic field, charged particles are forced onto a circular path. When they race through a finite, that is to say spatially delimited magnetic field, the particles therefore follow an arc of a circle. This effect is utilized, according to the invention, in order to deflect the action fluid itself in a flow duct of a turbomachine.

By means of the magnet, a both time-defined and spatially-defined magnetic field can be generated in the flow duct, thus leading to a defined deflection of charged particles in the action fluid and, on account of a pull effect as a result of pulse transfer, to a deflection of the action fluid itself. Deflection in this case takes place advantageously in the form of deflection planes between rotor and stator which are predetermined by the magnetic field and which possess a limited extent (localization of the magnetic field) in the main flow direction of the action fluid, for example in the axial direction in the case of an axial machine. The provision of a magnetic deflection plane for the charged particles or the action fluid by means of the magnetic field is very similar in its action to a conventional blade cascade: where an axial turbomachine is concerned, for example, a deflection of a predominantly axial flow of the action fluid takes place in a flow with both an axial and a tangential component, this being because of the fact that, on account of the Lorenz force, a tangential component is imparted to the charged particles perpendicularly to the flow direction as a result of the interaction with the magnetic field. This deflection is associated with a conversion of pressure energy of the action fluid into kinetic energy, in a similar way to a guide blade cascade of a conventional turbine. In the same way, it is possible, from a flow of the action fluid with an axial and tangential component, to achieve a conversion into a predominantly axial flow, with kinetic energy being converted into mechanical work, in a similar way to a moving blade cascade of a conventional turbine. Consequently, in a similar way to conventional turbines, a suitable magnetic field configuration, with a magnetic field in the flow duct is generated spatially and, if appropriate, in time by means of the magnet, makes it possible to have a progressive expansion of the action fluid, at the same time with the acquisition of mechanical work which can be transmitted in the form of rotational energy to the rotor.

By virtue of the invention, in this case, advantageously, the function of the deflection of the flowing action fluid, which, at high temperatures, can be implemented only at considerable cost or not at all by means of conventional blades, continues to be ensured, but, here, is achieved by means of a magnetic field or by means of magnetic fields, as compared with conventional turbine technology. In this case, the invention advantageously combines the known functional principle of conventional turbomachines with the deflection effect of a magnetic field on charged particles. At the same time, the specific disadvantages of the MHD power station concept can be avoided, because a thermal generation of a plasma at extremely high temperatures is not absolutely necessary for operating the turbomachine. In contrast to an MHD generator, not even direct current generation by charge deflection on electrodes is adopted, but, instead, mechanical energy in the form of rotational energy of the rotor is generated during the expansion of the action fluid in the turbomachine. It is thereby possible, in the development of novel gas turbine and steam turbine technologies with the concept of the turbomachine, to achieve markedly high process temperatures, thus leading to an increase in the thermal efficiency of the turbines. The application of a novel advantageous type of functioning for turbomachine construction is thereby possible, and, in this context, fundamental improvements may be expected.

In a preferred embodiment of the turbomachine, the stator has the magnet. In this case, it is possible to integrate the magnet into the stator, so that the magnetic field generated by the magnet acts into the flow duct. In this case, it is also possible for the stator to have a plurality of magnets, so that the magnetic field can be set highly accurately in spatial terms in the flow duct according to the requirements. In the case of an axial machine, in which the stator conventionally at the same time forms an outer boundary of the flow duct and at the same time can function as an outer casing of the turbomachine, the magnet is advantageously particularly readily accessible for possible maintenance or inspection work or for the mounting of sensors (for example, magnetic field sensors) for the diagnostics of the turbomachine. Furthermore, if a ferromagnetic substance is selected, the stator material may at the same time be used for increasing the magnetic flux density and consequently the magnetic field in the flow duct.

In a particularly preferred embodiment of the turbomachine, the magnetic field is directed radially and has at least one sign change along the axis of rotation of the rotor with respect to the radial direction.

A radial magnetic field can be generated, for example, by means of a magnet mounted on the stator, the magnetic field extending radially inward through the flow duct into the rotor. The sign change of the radial magnetic field component along the axis of rotation affords at least one region in the flow duct in which the flux lines of the magnetic field run, for example, radially inward from the stator to the rotor, and at least one second region in the flow duct in which flux lines emerge from the rotor, extend radially outward through the flow duct and enter the stator. Thus, with respect to the radial direction, there is an opposite sign of the magnetic field in the second region to what is the case in the first mentioned region. By means of the sign change of the magnetic field, it is possible to deflect charged particles in the flow duct in mutually opposite directions perpendicularly to the direction of movement of the charged particles, that is to say of the action fluid. Where an axial turbomachine is concerned, it is beneficial to provide at least one sign change of the magnetic field, so that along the axis of rotation of the rotor there are at least two different spatial regions with a magnetic field of different sign. During the movement of a charged particle along the axial direction of the turbomachine, therefore, a tangential deflection takes place in the first region, for example clockwise, while, in the second region, the charged particle experiences a force in the opposite direction, for example counterclockwise.

The functional principle of the turbomachine will be presented in a modeled manner by means of the following simplified methods of consideration: thus, the flux lines of the deflection magnetic field are taken into account only in their main direction of action, that is to say radially between rotor and stator, that is to say there is an idealized consideration of essentially parallel magnetic flux lines which are directed either radially inward or radially outward. This simplification therefore ignores dispersion influences and their effects, as should be permissible in the framework of an illustration of the fundamental principle. Furthermore, as compared with the consideration of the gas dynamics which consider the thermal movement of the particles within equal distribution in all directions of space, the movement of the ions is taken into account only with regard to the fraction which arises from the approach flow of the action fluid. The approach flow of the action fluid is superimposed on the thermal movements which are assumed to be distributed essentially equally. To that extent, the consideration of the deflection effect weighs up, as a statistical average, the velocity of the flowing action fluid which is superposed on this equal thermal distribution.

When entering a magnetic field generated in a defined manner in the flow duct radially between the rotor and stator by means of the magnet, electrically charged particles present in the flowing action fluid are deflected by the magnetic field. It is presupposed, here, that the main flow direction of the action fluid is the axial direction, as is the case, for example, in an axial turbomachine. Thus, there acts on the charged particles a force which is dependent on the magnetic flux density in the flow duct and on the velocity and charge of the particles and which is directed perpendicularly to the direction of movement. This deflection force is also designated as the Lorenz force. The charged particles in question are either electrons with a comparatively low mass and with a negative elementary charge or singly or multiply charged positive ions with a markedly higher mass. On account of different signs for the charged particles, the electrons are deflected in the opposite direction to the positive charged ions. Due to the marked differences in mass (about the factor $10^4$), moreover, the electrons are forced onto a much smaller circular path than the ions. When the radial magnetic field is set in such a way that the ions, when running through the magnetic field, experience a deflection which corresponds in its action to the deflection caused by a conventional blade cascade, then the electrons are consequently pulled onto a very much smaller circular path, the radius of which is generally smaller than the axial extent of the radial deflection field. The electrons therefore do not, like ions, leave the magnetic field with an accurately directed well defined deflection, but, instead, pass onto a circular path with a markedly smaller radius or a helical path, depending on the original direction and velocity on entry into the magnetic field. Moreover, as a result of collisions between electrons and other particles of the action fluid, changes in the trajectory and, if appropriate, in the velocity of the electrons occur, so that these can ultimately likewise leave the magnetic field. As a result of the accurately directed deflection of the ions provided with a comparatively high mass at a specific circumferential angle when they run through a region of the flow duct flooded with a magnetic field, in particular with a radial magnetic field, on the one hand, and of the essentially diffuse emergence of the markedly lighter electrons which is brought about by collision processes, on the other hand, an angular momentum is transmitted in the action fluid having the charged particles. Thus, depending on the spatial arrangement, intensity and sign of the magnetic field in the flow duct generated by the magnet, different deflection effects, that is to say a different transmission of angular momentum to the action fluid, can be set in terms of amount and of direction.

Preferably, an axially extending magnetic guide blade region with a constant sign of the magnetic field and an axially extending moving blade region with a sign of the magnetic field which is opposite to that of the guide blade region are provided.

In the magnetic guide blade region, an increase in the flow velocity occurs due to the deflection of the action fluid flowing in the axial direction, in a similar way to conventional turbine guide blade cascades. In this case, a tangential fraction is superposed from the axial main flow direction, a conversion of pressure energy into kinetic energy taking place. The magnetic guide blade region in this case has a defined sign of the magnetic field, that is to say radially inward or radially outward in the entire guide blade region. The magnetic guide blade region is in this case, in spatial terms, a part region of the flow duct. However, the intensity of the magnetic field may perfectly well vary within the magnetic guide blade region, but is preferably virtually constant. The magnetic guide blade region therefore defines, as it were, a deflection plane functioning as a guide blade cascade or a deflection disk which extends in the axial direction and which, considered in abstract, exerts on the action fluid an action which is equivalent to a conventional turbine guide blade cascade.

Similarly, a deflection of the largely axially directed flow of the action fluid takes place in the magnetic moving blade region, in such a way that the angular momentum extracted from the medium is transmitted to the rotor of the turbomachine. The magnetic field is in this case directed essentially radially in the magnetic guide blade region and in the magnetic moving blade region. The magnetic guide blade region and the magnetic moving blade region in this case form, for example, spatially different part regions of the flow duct. In this embodiment, the deflection of the action fluid in the turbomachine, for example in the form of deflection planes or deflection disks spatially delimited in the axial direction, takes place by means of a radially directed deflection magnetic field which extends through the flow duct between the stator and rotor. Owing to the extent (deflection disk or deflection plane) delimited spatially in the flow direction of the action fluid, the action of the magnetic guide blade region and the magnetic moving blade region is very similar to the action of blade cascades in conventional turbomachines, for example gas turbines, steam turbines or compressors. There is in this case a deflection of the predominantly axial flow into a flow with an axial and tangential component, pressure energy being converted into kinetic energy. The magnetic guide blade region is to that extent to be conceded as similar to a guide blade cascade of a conventional turbine in terms of the fundamental type of action. In the magnetic moving blade region, a deflection of a flow with an axial and tangential component into a predominantly axial flow takes place, kinetic energy being converted into mechanical work. This effect is essentially similar to the action of a moving blade cascade of a conventional turbine. Advantageously, by a suitable arrangement of successive magnetic guide blade regions and moving blade regions, an expansion of the working fluid which is progressed in a similar way to conventional turbines can be achieved, at the same time with mechanical energy in the form of rotational energy of the rotor being acquired.

Preferably, therefore, the magnetic moving blade region follows the magnetic guide blade region axially in the flow direction of the action fluid. A step is thereby produced in a similar way to a conventional turbomachine with a guide wheel and with a moving wheel. The magnetic step of the turbomachine in this case has a magnetic guide blade region and a magnetic movement blade region adjoining the latter axially. The magnetic moving blade region does not in this case have to directly adjoin the magnetic guide blade region in the flow direction. Between the magnetic guide blade region and the axially following magnetic moving blade region, the flow duct may be field-free or be essentially without an appreciable magnetic field. In an intermediate region of this kind, takes place then virtually no further deflection of the charged particles and, consequently, no further transmission of angular momentum to the flowing action fluid having the charged particles.

Preferably, a number of magnetic guide blade regions and moving blade regions are arranged alternately along the axis of rotation. A plurality of magnetic steps, that is to say a plurality of magnetic guide blade regions and of magnetic moving blade regions arranged alternately one behind the other axially, that is to say along the axis of rotation, can thus be implemented in the turbomachine. This, too, may again be seen as being somewhat analogous to the known turbomachines with a plurality of steps arranged axially one behind the other. Depending on requirements, therefore, turbomachines can be designed with a different number of steps and a different step size, in each case comprising a magnetic guide blade region and a magnetic moving blade region adjoining the latter.

Preferably, in order to delimit the magnetic field in the magnetic guide blade region, the magnetic guide blade region comprises a radially inwardly extending projection of the stator. By means of the radially inwardly extending projection, a local increase in the magnetic flux density is achieved, that is the magnetic flux lines are concentrated in the space between the projection and the rotor located opposite the projection inwardly in the radial direction. By virtue of this configuration, approximately, a magnetic dipole structure is produced locally, in which case, depending on the selected polarity, for example, magnetic flux lines emerging from the projection form a magnetic north pole, while the opposite rotor surface which the magnetic flux lines enter forms a south pole. The spatial confinement of the field allows an accurately directed deflection of charged particles in the action fluid, so that, analogously to a conventional turbomachine, a guide blade is produced, the principle of action of which is, however, based on the magnetic deflection of charged particles.

However, as compared with conventional blading, in the magnetic guide blade of the invention there is advantageously no need for any complex geometry for the projection. The projection may be configured, in terms of its geometry and its magnetic properties of the material, in such a way that the best possible results are achieved, in a similar way to a pole piece. The projection may in this case be adapted in a constructively simple way to the radial symmetry, in particular to the cylinder-envelope-shaped surface contour of the rotor, and consists of a material with high magnetic permeability, in order to achieve correspondingly high magnetic flux densities of the radial deflection magnetic field.

In a preferred embodiment, in order to axially delimit the magnetic field in the magnetic guide blade region, the stator has a radially inwardly extending circumferential ring in which the projection is arranged. The circumferential ring extends over the entire circumference about the axis of rotation of the rotor. The axial extent of the circumferential ring in this case determines essentially also the axial extent of the magnetic field. As a result of the axial and radial confinement, a magnetic deflection plane, more precisely a magnetic deflection disk on account of its axial dimension, is produced in the magnetic guide blade region, in a similar way to a guide blade row or cascade in a conventional turbomachine.

For this purpose, in a preferred embodiment, a plurality of radially inwardly extending projections are arranged over the entire circumference of the stator. The multiplicity of projections achieves, over the entire circumference, an identically acting and therefore reinforced deflection of the flow medium, spatial regions with a high magnetic field intensity being formed correspondingly to the number and arrangement of the projections. For reasons of symmetry, the projections are advantageously distributed regularly over the entire circumference of the stator, for example along an imaginary regular polygon. In this case, an embodiment of the circumferential ring, as described above, on which a plurality of projections are arranged, is particularly beneficial for radial and axial field confinement.

With regard to the magnetic moving blade region, this particularly preferred embodiment comprises a radially outwardly extending projection of the rotor in order to delimit the magnetic field spatially. The advantages of this configuration arise in a similar way to the magnetic guide blade region:

The radially outwardly extending projection achieves a local increase in the magnetic flux density, that is to say the magnetic flux lines are concentrated in a space between the projection and the stator located opposite the projection in a radial direction. Owing to this configuration, approximately, a magnetic dipole structure is implemented locally, in which case, depending on the selected polarity, magnetic flux lines emerging, for example, from the projection form a magnetic north pole, while the opposite stator surface which the magnetic flux lines enter forms a south pole. The spatial confinement of the field allows an accurately directed deflection of charged particles in the action fluid, so that the moving blade based on the magnetic deflection of charged particles is thereby intimated, in a similar way to conventional turbomachines.

Preferably, in this case, a plurality of radially outwardly extending projections are arranged over the entire circumference of the rotor. The multiplicity of projections achieves, over the entire circumference, an identically acting and therefore intensified deflection of the flow medium, spatial regions with high magnetic field intensity being formed correspondingly to the number and arrangement of the projections. For reasons of symmetry, the projections are advantageously distributed regularly over the entire circumference of the rotor, for example along an imaginary regular polygon. In this case, an embodiment with a circumferential ring, as already described above in connection with the magnetic guide blade region, on which a plurality of projections are arranged, is particularly beneficial for radial and axial field confinement.

Preferably, the turbomachine has an ionization device for the generation of charged particles in the action fluid. The ionization of neutral particles in the action fluid may in this case take place in various ways by means of the ionization device, for example by collision ionization or by radiation ionization. A suitable ionization process, on the principle of which the ionization device is to operate, must be selected, depending on the active cross section for the ionization of specific neutral particles. High temperatures, as in thermal plasma generation, are advantageously not required in this case. Multiple ionization is also possible. By means of the ionization device, therefore, an ion-containing action fluid can be generated or provided, which drives the magnetohydrodynamic turbomachine of the invention when it flows through the flow duct.

Preferably, the turbomachine has a recombination device for the recombination of charged particles in the action fluid.

The object directed at a method is achieved, according to the invention, by means of a method for operating a turbomachine with a rotor and with a stator and with a flow duct, in which an ion-containing action fluid flows through the flow duct, and a defined magnetic field is generated in the flow duct, ions being deflected in the magnetic field.

The advantages of the method arise in a similar way from the advantages of the turbomachine described above.

Thus, in a preferred embodiment of the method, the rotor is set in rotation as a result of the deflection of ions due to interaction with the magnetic field.

Also preferably, a radial magnetic field acting on the ions is generated in the flow duct in such a way that the tangential velocity component of the ion-containing action fluid is influenced in an accurately directed manner when the latter flows through the flow duct. The action of the Lorenz force on the charged particles, that is to say the ions which are markedly heavier than the electrons, is in this case utilized in a controlled way in order, as a result, to impart a net angular momentum (swirl) to the action fluid. The angular momentum transfer may lead to an increase in swirl or to a reduction in swirl of the flowing and expanding action fluid.

Preferably, in a flow duct, a radial magnetic field is generated which alternates along the flow direction of the ion-containing action fluid. In this context, alternating magnetic field means that, along the flow direction, the radial component of the magnetic field has at least one sign change, that is to say a polarity reversal of the radial component takes place.

In a preferred embodiment of the method, the magnetic field is in this case regulated in time and/or spatially. This may take place, for example, by means of a corresponding arrangement and electric activation of the magnet or magnets in order to generate a predeterminable field distribution in the flow duct.

Preferably, the ion-containing action fluid is formed by the ionization of particles in the action fluid before the flow of the latter through the flow duct. This may be achieved, for example, by means of an ionization device preceding the inlet orifice of the flow duct.

Also preferably, ions are formed by the ionization of particles in the action fluid during the flow of the latter through the flow duct. The in-situ generation in this case has the advantage that the ions can be generated in an accurately directed manner in the regions where they are also required for performing a magnetic deflection, that is to say in the magnetic guide blade region or the magnetic moving blade region.

To generate the ions, these are preferably formed by collision ionization. Alternatively or additionally, ions are formed by radiation ionization, action fluid being irradiated with a radiation having an ionizing action on particles in the action fluid. This radiation may be, for example, UV radiation or X-ray radiation.

Preferably, the action fluid is purified of harmful substances in a recombination process and/or a catalytic process. Purification is preferably carried out during and/or after the flow through the flow duct.

BRIEF DESCRIPTION OF THE DRAWINGS

The invention is explained in more detail by means of a drawing in which, in a simplified illustration not true to scale, FIG. 3 shows a sectional view in the axial direction through a magnetic guide blade region along the sectional line III-III of the turbomachine illustrated in FIG. 1, FIG. 4 shows a sectional view in the axial direction through a magnetic moving blade region along the sectional line IV-IV of the turbomachine illustrated in FIG. 1, FIG. 5 shows a graph of the pressure profile and velocity profile for a conventional turbine, FIG. 6 shows, in comparison with FIG. 5, a graph of the pressure profile and velocity profile for a turbine with magnetohydrodynamic blading, FIG. 7 shows a block diagram of the arrangement of the process functions by the example of a steam turbine, using magnetohydrodynamic blading, and FIG. 8 shows a block diagram of the arrangement of the process function by the example of a gas turbine, using magnetohydrodynamic blading.

Identical reference symbols have the same meaning in the figures.

DETAILED DESCRIPTION OF INVENTION

Figure 1:
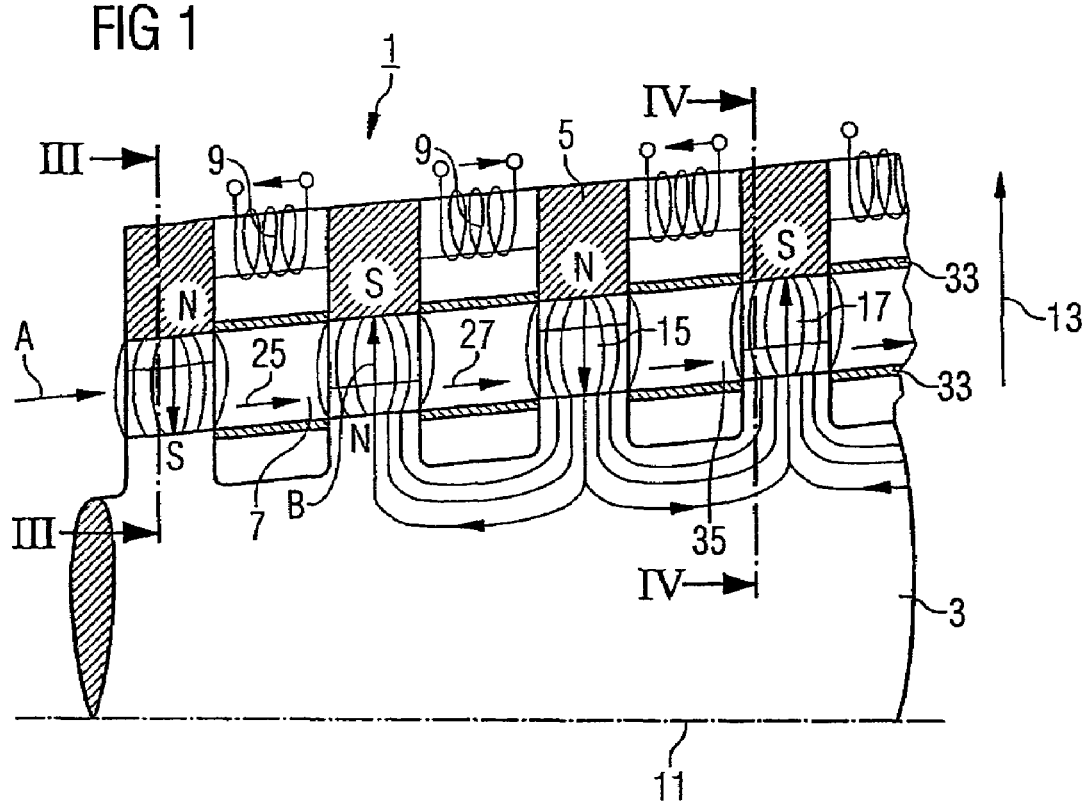
FIG. 1 shows a detail of a turbomachine based on a magnetohydrodynamic principle.

FIG. 1 shows a detail of a turbomachine 1 which operates according to a magnetohydrodynamic principle. For this purpose, the turbomachine 1 has a rotor 3 extending along an axis of rotation 11. A stator 5 surrounds the rotor 3, so as to be spaced apart concentrically from the latter, over the entire circumference, thus forming an annular axial flow duct 7, to which an ion-containing action fluid A, for example an ion-containing steam or a gas, can be supplied. The rotor 3 can be driven by the action fluid A when the latter flows through the flow duct 7, magnetic deflection effects on charged particles 25, in particular on ions 27, being utilized in an accurately directed manner in the action fluid A.

For this purpose, the turbomachine 1 has a magnet 9 for generating a predeterminable magnetic field B in the flow duct 7. The magnet 9 is integrated fixedly into the stator 5 and, for example, may be configured, as shown, as a magnet coil, the desired magnetic field B in the flow duct 7 being achieved, in terms of its field intensity, by the setting or regulating of an electrical current intensity through the coil. Advantageously, due to this design, only stationary windings are used. In order to increase the magnetic flux density, the stator 5 in this case consists at least partially of a ferromagnetic material. The rotor 3 is likewise produced from ferromagnetic material. As a result, a good magnetic field ring closure is achieved, and particularly high flux densities in the flow duct 7 are achieved precisely where the interaction of the magnetic field B with the ions 27 is provided. The magnetic field B is directed in the flow duct 7 essentially radially, that is to say perpendicularly to the main flow direction, parallel to the axis of rotation 11, of the action fluid A charged with ions 27. Along the axis of rotation 11 of the rotor 3, the magnetic field B has at least one sign change with respect to the radial direction, that is to say there is at least one polarity reversal. The magnetic field distribution is set in such a way that, as seen in spatial terms, an axially extending magnetic guide blade region 15 with a constant sign of the magnetic field is formed in the flow duct 7. Furthermore, an axially extending magnetic moving blade region 17 with a sign of the magnetic field B which is opposite to that of the guide blade region 15 is provided. Between the magnetic guide blade region 15 and the magnetic moving blade region 17, a virtually field-free interspace 35 is formed, in which no magnetic deflection of the charged particles 25 is to be noted. A magnetic moving blade region 17 in this case follows a magnetic guide blade region 15 axially so as to form the axial interspace 35. The magnetic field configuration thereby formed may be designated as a magnetohydrodynamic step or MHD step, in a similar way to a conventional turbine step.

A number of such MHD steps are arranged in succession along the axis of rotation 11, so that a corresponding number of magnetic guide blade regions 15 and moving blade regions 17 are arranged in the turbomachine 1 alternately along the axis of rotation 11 so as to form a respective field-free interspace 35. The interspace 35 is delimited radially inwardly, that is to say on the rotor side, and radially outwardly, that is to say on the stator side, by a respective flow guide plate 33. Since the interspace 35 is desired to be field-free, the advantageous embodiment of the flow guide plate 33 is not made from a ferromagnetic material.

Figure 2:
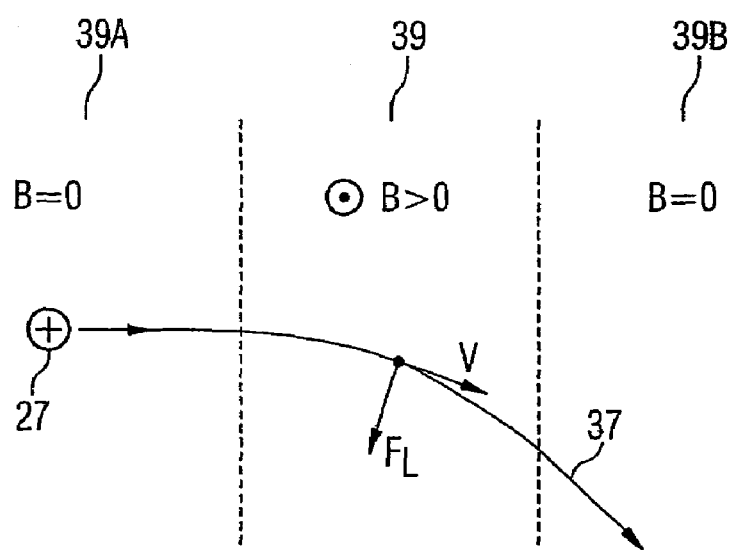
FIG. 2 shows a path curve of a charged particle in a spatially delimited magnetic field.

FIG. 2 shows, for explanatory purposes, a path curve 37 (trajectory) of a positively charged ion 27 in a spatially delimited magnetic field B, such as is obtained, ideally, by means of the MHD blading in the turbomachine 1 of FIG. 1. In this case, a spatially delimited region 39 with a magnetic field B is shown, which is delimited in the axial direction by field-free regions 39A, 39B. Owing to the action of the Lorenz force $F_L$ on the charged ion 27 moving at the velocity v, a deflection in the region 39 perpendicularly to the magnetic field direction and perpendicularly to the direction of movement of the ion 27 takes place, thus leading to a curved path curve 37 in the region 39. By contrast, no deflection takes place in the field-free regions 39A, 39B, that is to say the path curve runs in an essentially undisturbed manner, that is to say rectilinearly. This elementary field distribution of the magnetic field B and the action of said field distribution on a flowing expanding ion-containing action fluid A is proposed by the concept of the invention for the first time in a turbomachine.

FIG. 3 shows, for a more detailed explanation, a greatly simplified sectional view in the axial direction through a magnetic guide blade region 15 along the sectional line III-III of the turbomachine 1 illustrated in FIG. 1. The stator 5 surrounds the rotor 3 concentrically so as to form the flow duct 7. To delimit the magnetic field B in a magnetic guide blade region 15, the magnetic guide blade region 15 has a plurality of radially inwardly extending projections 19 which are arranged over the entire circumference of the stator 5. The projections 19 are in this case arranged on a circumferential ring 29A extending radially inwardly into the flow duct 7 and, for example, are connected in one piece to said circumferential ring. The circumferential ring 29A having the projections 19 surrounds the rotor 5 over the entire circumference and forms part of a stator casing, not illustrated in any more detail. For greater clarity, the field distribution of the magnetic field B is illustrated only in a part region of the guide blade region 15. The polarity is selected such that the magnetic north pole N is formed at the projections 19 of the stator 5, so that the flux lines emerge at the projections 19, penetrate inwardly through the flow duct 7 predominantly in the radial direction and enter the interior of the rotor 3 through the rotor surface 41. Owing to the ions 27 in the flowing action fluid A, a charge current through the flow duct 7 is achieved, which interacts with the magnetic field in the magnetic guide blade region 15 and in the magnetic moving blade region 17 (FIG. 4), and in this case an inductive effect is to be noted. Thus, on account of the charge current itself, similarly to a live conductor in a magnetic field, a magnetic field is generated which is superposed on the external magnetic field B in the flow duct. As a result, along the charge current, in the case of constructive superposition, field regions with increased flux line density are formed and, at the same time, in the case of a destructive superposition, corresponding field regions with a lower flux line density are formed. Since magnetic flux lines tend to be shortened, this leads to a deflection of the charge current from the field region with increased flux line density to the field region with lower flux line density (Lorenz Law).

FIG. 4 shows, in a similar illustration to FIG. 3, a sectional view of the axial direction through a magnetic moving blade region 17 along the sectional line IV-IV of the turbomachine illustrated in FIG. 1.

For the spatial delimitation of the magnetic field B of the magnetic moving blade region 17, the magnetic moving blade region 17 has a plurality of radially outwardly extending projections 21 which are arranged over the entire circumference of the rotor 3 on a circumferential ring 29B of the rotor 5. The circumferential ring 29B serves for the spatial delimitation, in particular in the axial direction, of the magnetic field B in the magnetic moving blade region 17 and extends radially outwardly. Here, as compared with the magnetic guide blade region 17 (FIG. 3), the polarity of the magnetic field B is selected such that magnetic north poles N are in this case formed at the projections 21 of the rotor 5, so that the flux lines emerge at the projections 21, penetrate outwardly through the flow duct 7 in the radial direction and enter the interior of the stator 3 through the stator surface 43. By means of the projections 19, 21, a concentration of the magnetic flux lines, that is to say an increased intensity of the radial magnetic field B, in the guide blade region 17 and in the moving blade region 15 is achieved, and the interaction of the magnetic field B with the charge current accompanying it due to the movement of the ions 27 is thereby restricted to these local regions. By virtue of the field distribution in the guide blade region 17 and in the moving blade region 15, magnetic deflection planes (guide planes and moving planes) or, on the basis of the axial dimension, deflection disks are produced.

The provision of such magnetic deflection planes for the charged particles 25, 27 or the ion-containing action fluid A by means of the magnetic field B is in this case really similar in its action to a conventional blade cascade:

In the case of an axial turbomachine 1, as discussed here by way of example, there is, for example, a deflection of the predominantly axial flow of action fluid A in a flow with both an axial and a tangential component, this being because, by virtue of the Lorenz force $F_L$ (FIG. 2), a tangential component is imparted to the charged particles 25, 27 perpendicularly to the flow direction as a result of interaction with the magnetic field B.

This deflection is associated with a conversion of pressure energy of the action fluid A into kinetic energy, in a similar way to a guide blade cascade of a conventional turbine. In the same way, it is possible, from a flow of the action fluid A with an axial and a tangential component, to achieve a conversion into a predominantly axial flow, with kinetic energy being converted into mechanical work, in a similar way to a moving blade cascade of a conventional turbine. Consequently, in a way similar to conventional turbines, a suitable magnetic field configuration with a magnetic field B in the flow duct generated spatially and, if appropriate, in time by the magnet 9 allows a progressive expansion of the action fluid A, along with the acquisition of mechanical work which can be transmitted in the form of rotational energy to the rotor 3 on account of the magnetically induced angular momentum change to be noted, so that said rotor rotates at an angular speed ω.

In order to illustrate the analogy of the MHD turbomachine 1 to a conventional turbine, for example a steam turbine, FIGS. 5 and 6 show the pressure profile 49 and the velocity profile 51 for a conventional reaction turbine with conventional blading (FIG. 5) and for a turbomachine 1 with MHD blading. The path profile 37, shown in FIG. 5, of a particle, for example of a gas or steam molecule, through the turbine steps, which are formed in each case from a conventional guide wheel 45 and moving wheel 47, is to a great extent similar in quality to the path profile 37 of an ion 27 when the latter runs through the magnetic steps of the invention, which are composed in each case axially in succession from a magnetic guide blade region 15, a field-free interspace 35 and a magnetic moving blade region 17. This analogy is also to be found in the pressure profile 49 and in the velocity profile:

The pressure profile 49 of the action fluid A expanding in the axial direction is plotted in the middle part graph of FIGS. 5 and 6 against the axial running length L (FIG. 6) and against the number of steps (FIG. 5). The pressure p is plotted on the Y-axis of the coordinate system and the axial running length L or the number of steps is plotted on the X-axis. In both part graphs, the pressure p decreases, regularly, in the form of steps along the X-axis, and, particularly in the magnetic guide blade region 17 and moving blade region 15, a marked pressure drop is to be noted, according to the pressure profile, over the conventional guide blade row 45 and moving blade row 47. The pressure p is approximately constant in between.

The velocity profile 51 of the action fluid A expanding in the axial direction is plotted in the lower part graph of FIGS. 5 and 6 against the axial running length L (FIG. 6) and against the number of steps (FIG. 5). The velocity c is plotted on the Y-axis of the coordinate system and the axial running length L or the number of steps is plotted on the X-axis. What is meant by the velocity c is in these cases what is known as the absolute velocity, a quantity which is generally known in turbine construction.

In the two part graphs, the velocity c alternates equally between a minimum value $c_{min}$ and a maximum value $c_{max}$. Thus, the velocity c over a guide blade row 45 rises from the minimum value $c_{min}$ to the maximum value $c_{max}$, reaches a plateau-shaped virtually constant segment and subsequently, over the following moving blade row 47, decreases again from the maximum value $c_{max}$ to the minimum value $c_{min}$. This velocity profile 51 is also to be found exactly in the corresponding lower part graph of FIG. 6, where these effects on the velocity c also occur during the axial expansion of the action fluid A through a magnetic guide blade region 15, interspace 35 and the magnetic moving blade region 17.

In a block diagram, FIG. 7 shows diagrammatically, in greatly simplified form, the arrangement of the process functions D1 to D7 and process devices by the example of a steam turbine, using magnetohydrodynamic (MHD) blading of the invention. First, preceding process functions D1 and D2 are provided, which are carried out before the actual MHD process in a turbomachine 1, here a steam turbine with a steam process. The preceding process functions comprise, in the first place, the supply of heat into the action fluid A, here water or steam. The heating of the action fluid in process step D1 may in this case take place, for example, in a boiler, a steam generator boiler. Subsequently, a conventional steam turbine process takes place (optionally) in D2, the heated action fluid A flowing through a conventional steam turbine blading so as to perform work and at the same time partially expanding. To generate an ion-containing action fluid A, the ionization of particles in the action fluid A is provided in process step D3. For this purpose, an ionization device 23 is implemented, which generates ions 27 (cf. also FIG. 1) with sufficient density in the action fluid A, for example by means of radiation ionization or of electron collision ionization. In process step D4, the actual MHD process is carried out. The ion-containing action fluid A flows through the flow duct 7, a defined magnetic field B being generated in the flow duct 7, the ions being deflected in the magnetic field. The rotor 3 of the MHD turbomachine 1 is set in rotation as a result of the deflection of the ions 27 owing to interaction with the magnetic field. Ions 27 may in this case also be generated in MHD process step D4 by the ionization of particles in the action fluid A during the flow of the latter through the flow duct 7. If necessary, the MHD process step D4 is followed by a process step D5 in which the action fluid is purified of harmful substances in a recombination process and/or in a catalytic process. For this purification step, for example, a recombination device 31 is implemented.

The following process steps D6 and D7 are of the conventional type: thus, a conventional steam turbine process again takes place (optionally) in D6, the still hot action fluid A flowing through a conventional steam turbine blading so as to perform work and at the same time expanding further. As high an overall efficiency of the entire steam turbine plant as possible can thereby be achieved. Finally, in process step D7, the discharge of heat from the largely expanded action fluid A is carried out in a condenser 53.

In a further block diagram, FIG. 8 shows diagrammatically, in greatly simplified form, the arrangement of the process functions G1 to G7 and process devices by the example of a gas turbine, using magnetohydrodynamic (MHD) blading of the invention. First, a preceding process function D1 is provided, which is carried out before the actual MHD process in a turbomachine 1, here a gas turbine with a gas turbine process. The preceding process function G1 first comprises the compression of an action fluid A, here of compressor air in a conventional compressor part. Subsequently, in G2, an MHD compressor process optionally takes place, in which an ion-containing action fluid A is generated by means of an ionization device 23 and is compressed in an MHD process in an MHD compressor with MHD blading. Thereafter, in step G3, the action fluid A compressed in this way is heated. The heating of the action fluid A in process step G3 may in this case be carried out, for example, in the combustion chamber of the gas turbine, the compressor air from process step G2 being burnt together with a fuel, and hot combustion gas thus being available as action fluid A for the following process step G4.

To generate an ion-containing action fluid A, in process step G4, the ionization of particles in the action fluid A is provided. For this purpose, an ionization device 23 is implemented, which generates ions 27 (cf. also FIG. 1) with sufficient density in the action fluid A, for example by means of radiation ionization or of electron collision ionization. In process step G4, at the same time, the actual MHD process is carried out. The ion-containing action fluid A flows through the flow duct 7, a defined magnetic field B being generated in the flow duct 7, the ions 27 being deflected in the magnetic field. The rotor 3 of the MHD turbomachine 1, here an MHD gas turbine, is set in rotation as a result of the deflection of the ions 27 owing to interaction with the magnetic field. Ions 27 may in this case also be generated additionally in MHD process step G4, even before entering the flow duct 7, by the ionization of particles in the action fluid A. If necessary, the MHD process step G4 is followed by a process step G5 in which the action fluid A is purified of harmful substances in a recombination process and/or in a catalytic process. For this purification step, for example, a recombination device 31 is implemented. The following process steps D6 and D7 are of a conventional type: thus, in G6, a conventional gas turbine process again takes place (optionally), the still hot action fluid A, that is to say the hot gas, flowing through a conventional gas turbine blading so as to perform work and at the same time expanding further and cooling. As high an overall efficiency as possible of the entire gas turbine plant which comprises process steps G1 to G7 can thereby be achieved. Finally, in process step G7, the discharge of heat from the already largely expanded and cooled action fluid A is carried out in a waste heat recovery boiler 55, another heat exchanger device or a chimney.

It remains to be said, in summary, that, as was shown, an MHD blading for a turbine machine can mean that both magnetic guide blade regions 15 and magnetic moving blade regions 17 are implemented in a turbomachine 1 by the magnetohydrodynamic effect being utilized. It is, however, also possible to combine a conventional guide wheel or guide blade row 45 with a magnetic moving blade region 17 or else a magnetic guide blade region 15 with a conventional moving wheel or moving blade row 47. In this respect, therefore, "mixed steps" with MHD and conventional blading can also be implemented in a turbomachine 1 or in a process plant with a turbomachine 1. In this case, it is expedient, for the operation of the turbomachine 1, to precede the MHD process with the ionization device 23, so that a sufficiently high density of ions 27 in the action fluid is ensured even upon entry into the flow duct 7 of the turbomachine 1. Reionization can be carried out continuously or repeatedly by means of suitable ionization devices 23 in the course of the process, that is to say during the flow of ion-containing action fluid A through the flow duct 7. A recombination device 31 may be provided for purification after the flow through the MHD blading or, if appropriate, even along the latter, particularly in the case of devices or components in the flow duct 7 which require protection. In the latter instance, it is advisable to carry out the renewed ionization of action fluid A in the flow duct 7 before the action fluid A flows into the next magnetic guide blade region 15 or moving blade region 17.

The invention claimed is:

1. A turbomachine, comprising:
   a rotor;
   a stator;
   a flow duct for guiding an action fluid, the action fluid provided for driving the rotor; and
   a magnet for generating a predetermined magnetic field in the flow duct arranged on the stator, and the magnetic field is oriented radially relative to a rotation axis of the rotor.

2. The turbomachine as claimed in claim 1, wherein the magnetic field changes its orientation by 180° at least one time along the rotation axis.

3. The turbomachine as claimed in claim 1, further comprising:
   a magnetic vane region extending along the rotation axis, the magnetic guide blade region having a uniform orientation of the magnetic field; and
   a magnetic blade region extending along the rotation axis, the magnetic blade region having a uniform orientation of the magnetic field, wherein the magnetic field in the blade region is contrarily oriented relative to magnetic field in the vane region.

4. The turbomachine as claimed in claim 3, wherein the magnetic blade region is arranged downstream of the magnetic vane region relative to a flow direction of the action fluid.

5. The turbomachine as claimed in claim 3, wherein a number of magnetic vane regions and blade regions are arranged alternately along the rotation axis.

6. The turbomachine as claimed in claim 3, wherein the stator comprises a first circumferential ring for limiting the magnetic field in the magnetic vane region, the first circumferential ring extending radially inwards relative to the rotation axis.

7. The turbomachine as claimed in claim 3, wherein the rotor comprises a first projection projecting radially inwards relative to the rotation axis for limiting the magnetic field in the magnetic vane region, the first projection included in the magnetic vane region.

8. The turbomachine as claimed in claim 7, comprising a plurality of radially inwards extending first projections arranged across the entire circumference of the stator.

9. The turbomachine as claimed in claim 3, wherein the rotor comprises a second circumferential ring for limiting the magnetic field in the magnetic blade region, the second circumferential ring extending radially outwards relative to the rotation axis.

10. The turbomachine as claimed in claim 3, wherein the rotor comprises a second projection projecting radially outwards relative to the rotation axis for limiting the magnetic field in the magnetic blade region, the second projection included in the magnetic blade region.

11. The turbomachine as claimed in claim 10, comprising a plurality of radially outwards extending second projections arranged across the entire circumference of the rotor.

12. A turbomachine, comprising:
    a rotor;
    a stator;
    a flow duct for guiding an action fluid, the action fluid provided for driving the rotor;
    a magnet for generating a predetermined magnetic field in the flow duct; and
    an ionization device for generating charged particles included in the action fluid.

13. The turbomachine as claimed in claim 12, further comprising a recombination device for the recombining charged particles included in the action fluid.

14. A method of operating a turbomachine having a rotor, a stator and a flow duct for guiding an action fluid, the action fluid including ions, the method comprising:
    generating a magnetic field;
    directing the magnetic field through the flow duct;
    passing the action fluid through the flow duct; and
    deflecting the ions by the magnetic field,
    wherein the ions included in the action fluid are generated by ionization of the action fluid before the action fluid enters the flow duct.

15. The method as claimed in claim 14, wherein the rotor is rotatably actuated by the deflected ions.

16. The method as claimed in claim 14, wherein the magnetic field is oriented radially relative to a rotation axis of the rotor, and a tangential velocity component of the action fluid is exclusively affected by the magnetic field.

17. The method as claimed in claim 14, wherein the magnetic field is oriented radially relative to a rotation axis of the rotor, and an orientation of the magnetic field alternates along a flow direction of the action fluid.

18. The method as claimed in one of claim 14, wherein the magnetic field is controlled regarding its shape or behavior over time.

19. The method as claimed in claim 14, wherein the ions are generated by ionizing fluid particles included in the action fluid while the action fluid flows through the flow duct.

20. The method as claimed in claim 14, wherein the ions are generated using a collision ionization mechanism.

21. The method as claimed in claim 14, wherein the ions are generated using a radiation ionization mechanism.

22. The method as claimed in one of claim 14, wherein the action fluid is purified using a recombination process or a catalytic process for extracting harmful substances from the action fluid.

23. The method as claimed in claim 22, wherein the action fluid is purified before the action fluid enters the flow duct.

24. The method as claimed in claim 22, wherein the action fluid is purified after the action fluid exits the flow duct.

* * * * *